US 6,735,618 B1

(12) United States Patent
Niwa (10) Patent No.: US 6,735,618 B1
(45) Date of Patent: May 11, 2004

(54) ELECTRONIC MAIL SYSTEM FOR REARRANGING STORED MAIL DATA ACCORDING TO MONITORED DATA RECEIVING CONDITION

(75) Inventor: Yushi Niwa, Tokyo (JP)

(73) Assignee: NEC Corporation, Tokyo (JP)

( * ) Notice: Subject to any disclaimer, the term of this patent is extended or adjusted under 35 U.S.C. 154(b) by 642 days.

(21) Appl. No.: 09/586,621

(22) Filed: Jun. 2, 2000

(30) Foreign Application Priority Data

Jun. 4, 1999 (JP) .......................................... 11-158748

(51) Int. Cl.[7] ............................................... G06F 15/16
(52) U.S. Cl. ......................... 709/207; 709/206; 455/466
(58) Field of Search ................................ 709/206, 207; 455/466, 412.1, 412.2, 115.3, 226.2, 226.4

(56) References Cited

U.S. PATENT DOCUMENTS

| 5,812,770 | A |   | 9/1998  | Sakai ..................... 395/200.16 |
| 5,966,663 | A | * | 10/1999 | Gleason ...................... 455/466 |
| 6,101,531 | A | * | 8/2000  | Eggleston et al. .......... 709/206 |
| 6,226,670 | B1 | * | 5/2001 | Ueno et al. ................. 709/207 |
| 6,499,021 | B1 | * | 12/2002 | Abu-Hakima ................ 706/10 |

FOREIGN PATENT DOCUMENTS

| JP | 64-39853    | 2/1989  |
| JP | 3-117940    | 5/1991  |
| JP | 4-82347     | 3/1992  |
| JP | 5-22339     | 1/1993  |
| JP | 6-62051     | 3/1994  |
| JP | 7-234826    | 9/1995  |
| JP | 10-21164    | 1/1998  |
| JP | 10-69472    | 3/1998  |
| JP | 10-136424   | 5/1998  |
| JP | 11-127186   | 5/1999  |
| JP | 11-331234   | 11/1999 |
| JP | 2000-253017 | 9/2000  |

* cited by examiner

Primary Examiner—David Wiley
Assistant Examiner—Scott M. Collins
(74) Attorney, Agent, or Firm—Foley & Lardner (57) ABSTRACT

An electronic mail system for efficiently transmitting mail data according to a change of the transmission condition of the wireless transmission path is disclosed. The system comprises a mail sender including a mail receiving unit, storage device, mail sending unit, command interpreting section, and mail order rearranging section, and a mail receiver including a mail receiving unit, a receiving condition monitoring section, and a command issuing section. The mail receiving unit monitors the condition of receiving mail data at predetermined intervals, and generates a detection signal when the receiving condition changes. According to the detection signal, the mail receiver sends a command ordering the rearrangement of the mail data. The mail sender receives the command, and rearranges the mail data stored in the storage device.

13 Claims, 9 Drawing Sheets

| NAME | ARRIVAL TIME | DATA SIZE |
|---|---|---|
| MAIL DATA A | 5 A.M. | 900 BYTE |
| MAIL DATA B | 10 A.M. | 1500 BYTE |
| MAIL DATA C | 11 A.M. | 1000 BYTE |

ELECTRONIC MAIL SYSTEM FOR REARRANGING STORED MAIL DATA ACCORDING TO MONITORED DATA RECEIVING CONDITION

BACKGROUND OF THE INVENTION

1. Field of the Invention

The present invention relates to an electronic mail system for efficiently transmitting mail data coping with the fluctuation of the transmission quality of each wireless transmission path, which is a constituent of the communication network for connecting the mail server and clients.

2. Description of the Related Art

Most conventional electronic mail systems (abbreviated as "e-mail systems", hereinbelow) have been developed on the premise of using a wire communication line as the transmission path. In wire communication lines, transmission quality is stable and thus it is unnecessary to consider problems such as fluctuation of the transmission quality or disconnection of the line during the mail data transmitting or receiving operation. Such a problem often occurs in the wireless-line communication. In an example method of efficiently operating the e-mail system, priority is set for each e-mail (i.e., electronic mail) in accordance with the importance or urgency of the e-mail so as to rearrange the e-mail data, where such a rearranging operation is executed after the current e-mail is received by the relevant client. Examples of the above kind of conventional e-mail system are disclosed in Japanese Unexamined Patent Application, First Publication, Nos. Hei 4-82347 and Hei 5-22339.

However, recently, data transmission using mobile terminals such as cellular phones has been widespread, and data transmitting or receiving operation is often performed under an undesirable condition, that is, with degraded transmission quality generated when the mobile terminal moves with a high speed or when a weak radio wave is received. When an e-mail is sent using such a degraded communication line, retransmission may be necessary, and as the number of repeating retransmission increases, a longer transmission time is necessary.

If a plurality of mail data addressed to a client are stored in a mail server, the mail data are sent to the client in turn according to the order of arrival of the mail data when a mail data sending request is sent from the client. Therefore, when a relatively large mail data is stored at the head (top of the output queue) and relatively small mail data is stored after the relatively large mail data, if the wireless transmission path becomes unstable, then the relatively large mail data is not stably transmitted and thus the following relatively small mail data may not be transmitted, so that the number of normally received mail data decreases.

In general data communication, the calling and called sides use a protocol defined for correctly sending data, in which data is divided into data units, each having a specific data amount, and it is confirmed whether each data unit has been normally sent and received, and if the confirmation fails, the relevant data unit is retransmitted. According to such a protocol, divided data units of mail data are sent in turn, and when all data units of an e-mail have been sent and received, the mail-data transmitting operation is completed. Therefore, the probability of completion of the mail-data transmission decreases in inverse proportion to the size of the mail data. As the size of the mail data increases, the number of data units, each having a specific data amount, increases; therefore, the number of times for confirming whether the data is normally sent and received increases and the probability of retransmission of each divided data unit also increases. Accordingly, the transmission time of data corresponding to an e-mail becomes longer, and a longer time is necessary for completing the mail data transmission if the transmission condition of the wireless transmission path is unstable.

As described above, in the conventional e-mail system, a plurality of mail data stored in the mail server are sent to a relevant client in their arrival order. Therefore, if the wireless transmission path is unstable and relatively large mail data is sent first, the transmission of the relatively large mail data takes a long time, and the following small mail data may not be sent, thereby degrading the mail data transmission efficiency. In addition, in the conventional system, the mail data sent while the wireless transmission path is stable is not always relatively important and urgent mail data; therefore, efficient transmission according to a user's request, such as sending an important e-mail first, cannot be performed.

SUMMARY OF THE INVENTION

In consideration of the above circumstances, an objective of the present invention is to provide an electronic mail system for monitoring the condition of receiving mail data so as to cope with a change of the condition of a wireless transmission path in the communication network, and for efficiently transmitting mail data when the transmission quality is degraded, by, for example, rearranging the order of sending mail data stored in the mail server and sending an e-mail having a smaller data size first.

Therefore, the present invention provides an electronic mail system comprising:
- a mail server having a mail sender which is connected to a first communication network including a data communication network and which receives an electronic mail and sends the received electronic mail to a relevant client;
- a client having a mail receiver for receiving the electronic mail sent from the mail sender; and
- a second communication network including a wireless transmission path, for connecting the mail server and the client, wherein:
  - the mail sender comprises:
    - a first mail receiving unit for receiving mail data of each electronic mail sent via the first communication network,
    - a storage device for storing the mail data received by the first mail receiving unit in turn;
    - a mail sending unit for reading out the mail data stored in the storage device, and sending the readout data to the second communication network;
    - a command interpreting section for receiving and interpreting a command, generated by the client, sent via the second communication network, and outputting a signal ordering rearranging the mail data stored in the storage device; and
    - a mail order rearranging section for rearranging the order of the mail data stored in the storage device, based on the signal sent from the command interpreting section, and
  - the mail receiver comprises:
    - a second mail receiving unit for receiving a wireless signal from the second communication network, and demodulating and storing the mail data from the received signal, and monitoring the condition of receiving the wireless signal of the mail data so as to detect a change of the receiving condition and output a detection signal;

a receiving condition monitoring section for receiving the detection signal indicating a change of the receiving condition from the second mail receiving unit, and outputting a signal ordering the issue of a command; and a command issuing section for sending a command signal according to the output from the receiving condition monitoring section to the second communication network.

In the above basic structure, the second mail receiving unit may comprise a radio wave monitoring section for detecting and outputting the intensity of the received radio wave of the wireless signal at predetermined intervals, and generate the detection signal indicating a change of the receiving condition based on the output from the radio wave monitoring section.

In this case, it is possible that the output from the radio wave monitoring section is compared with a predetermined threshold value, and the detection signal is generated when the intensity of the received radio wave becomes lower than the threshold value.

It is also possible that a variation of the intensity of the received radio wave per unit time is calculated based on the output from the radio wave monitoring section, and the detection signal is generated when the variation becomes larger than a predetermined threshold value.

Also in the above basic structure, the mail data may be sent to the mail receiving unit in a divided form; and the second mail receiving unit may comprise a mail receiving section for reconstructing and outputting the mail data corresponding to an electronic mail, and also outputting information on the size of the reconstructed mail data at predetermined intervals. In this case, it is possible that the second mail receiving unit calculates the speed of reconstruction of the mail data at predetermined intervals based on the data size information output from the mail receiving section, and generates the detection signal indicating a change of the receiving condition based on the calculated speed of reconstruction.

In the above case, the second mail receiving unit may compare the speed of mail data reconstruction with a predetermined threshold value, and generate the detection signal when the speed becomes lower than a predetermined threshold value.

Also in the above case, the second mail receiving unit may calculate a variation of the speed of mail data reconstruction per unit time, and generate the detection signal when the variation becomes larger than a predetermined threshold value.

In a preferable example, the second mail receiving unit comprises a storage device for storing the received mail data and outputting information on the vacant capacity at predetermined intervals, and generates the detection signal indicating a change of the receiving condition when the vacant capacity of the storage device, detected according to the information on the vacant capacity, becomes lower than a predetermined capacity.

In another preferable example, the second mail receiving unit comprises an input device for a user of the mail receiver to input a signal for communicating a change of the receiving condition, or a signal for ordering the rearrangement of the sending order of mail data stored in the mail sender; and the second mail receiving unit generates the detecting signal supplied to the receiving condition monitoring section, based on a signal input via the input device.

It is also possible that:

the second mail receiving unit comprises a wireless data processing section for receiving and demodulating the wireless signal from the second communication network, and measuring an error rate of the demodulated digital signal of the mail data according to specific codes included in the digital signal; and the second mail receiving unit generates the detection signal when the measured error rate of the digital signal becomes larger than a predetermined threshold value.

It is also possible that the second mail receiving unit comprises a radio wave monitoring section for measuring the power supply voltage of the mail receiver at predetermined intervals, and generates the detection signal when the measured power supply voltage becomes lower than a predetermined threshold value.

According to the present invention, the condition of receiving mail data is monitored by the mail receiver at the client side so as to detect a change of the transmission condition of the wireless transmission path. When a change is detected, a command is sent to the mail server side so that the sending order of the mail data can be rearranged. Therefore, it is possible to efficiently transmit the mail data under the degraded transmission quality, thereby improving the operation efficiency of the electronic mail system.

In the rearrangement of the mail data performed by the mail order rearranging section, the order of the mail data may be determined according to the degree of importance or urgency of each electronic mail.

Typically, the storage device in the mail sender also stores mail data storage information which indicates a property of each electronic mail.

Accordingly, the priority of the transmission can be set for each e-mail (i.e., electronic mail) in accordance with the importance or urgency of the e-mail so as to rearrange the e-mail data, thereby improving the convenience of the e-mail system.

DESCRIPTION OF THE PREFERRED EMBODIMENTS

First Embodiment

Hereinafter, the first embodiment according to the present invention will be explained in detail with reference to the drawings.

Figure 1:
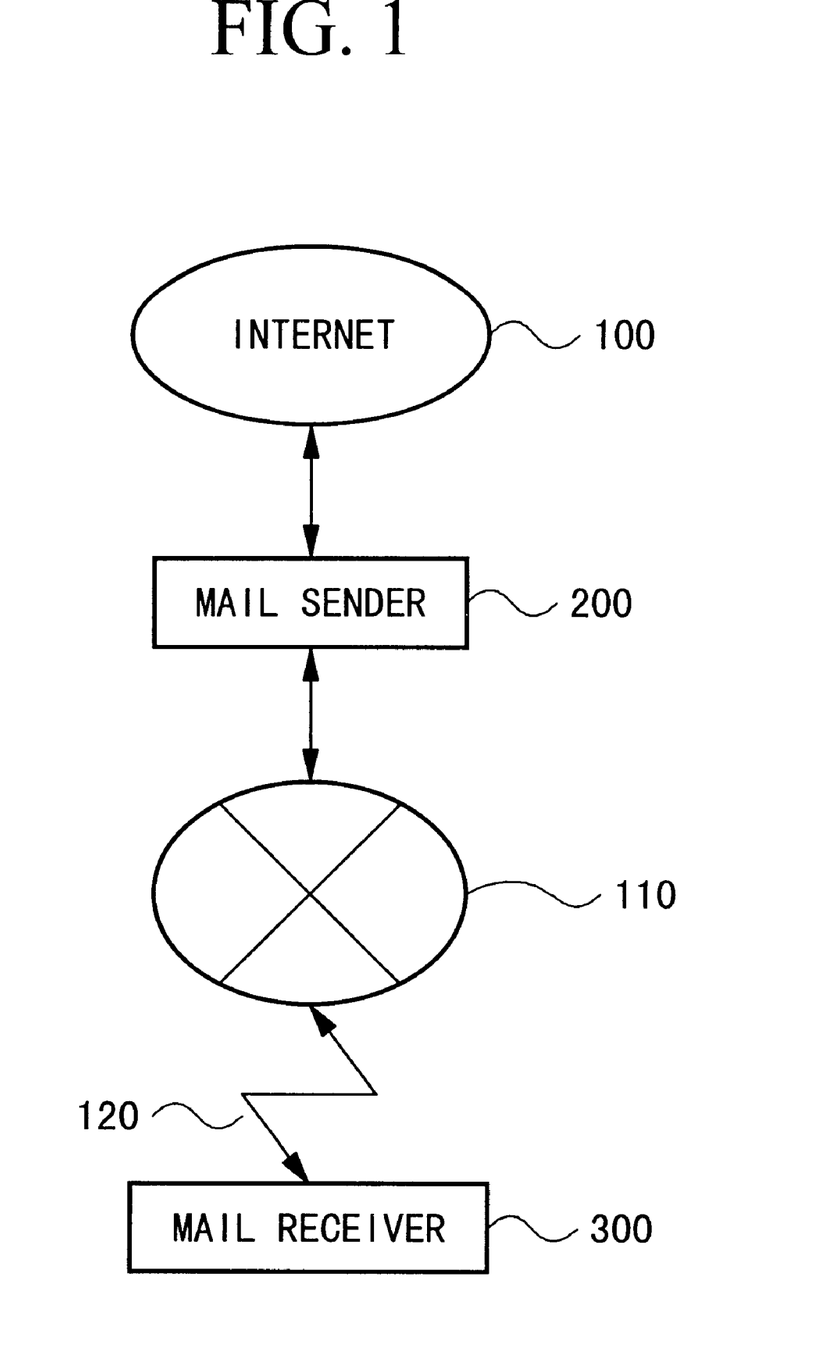
FIG. 1 is a diagram showing the general structure of the e-mail system of the first embodiment according to the present invention.

FIG. 1 is a diagram showing the general structure of the e-mail system of the first embodiment. In this figure, mail sender 200 of a mail server is connected via a wire transmission path to communication network 100, so that the mail sender 200 receives and stores mail data sent via the wire transmission path from any mail sending device connected to the communication network 100.

The communication network 100 is a data communication network spread throughout and outside of the country, such as the Internet. The mail sender 200 is connected via communication network 110 and wireless transmission path 120 to mail receiver 300. The communication network 110 comprises public and/or dedicated lines, and is connected to the wireless transmission path 120. The communication network 110 and wireless transmission path 120 form a communication network provided by, for example, a communication provider employing cellular phones. The mail receiver 300 receives and stores mail data sent from the mail sender 200 via communication network 110 and wireless transmission path 120.

Figure 2:
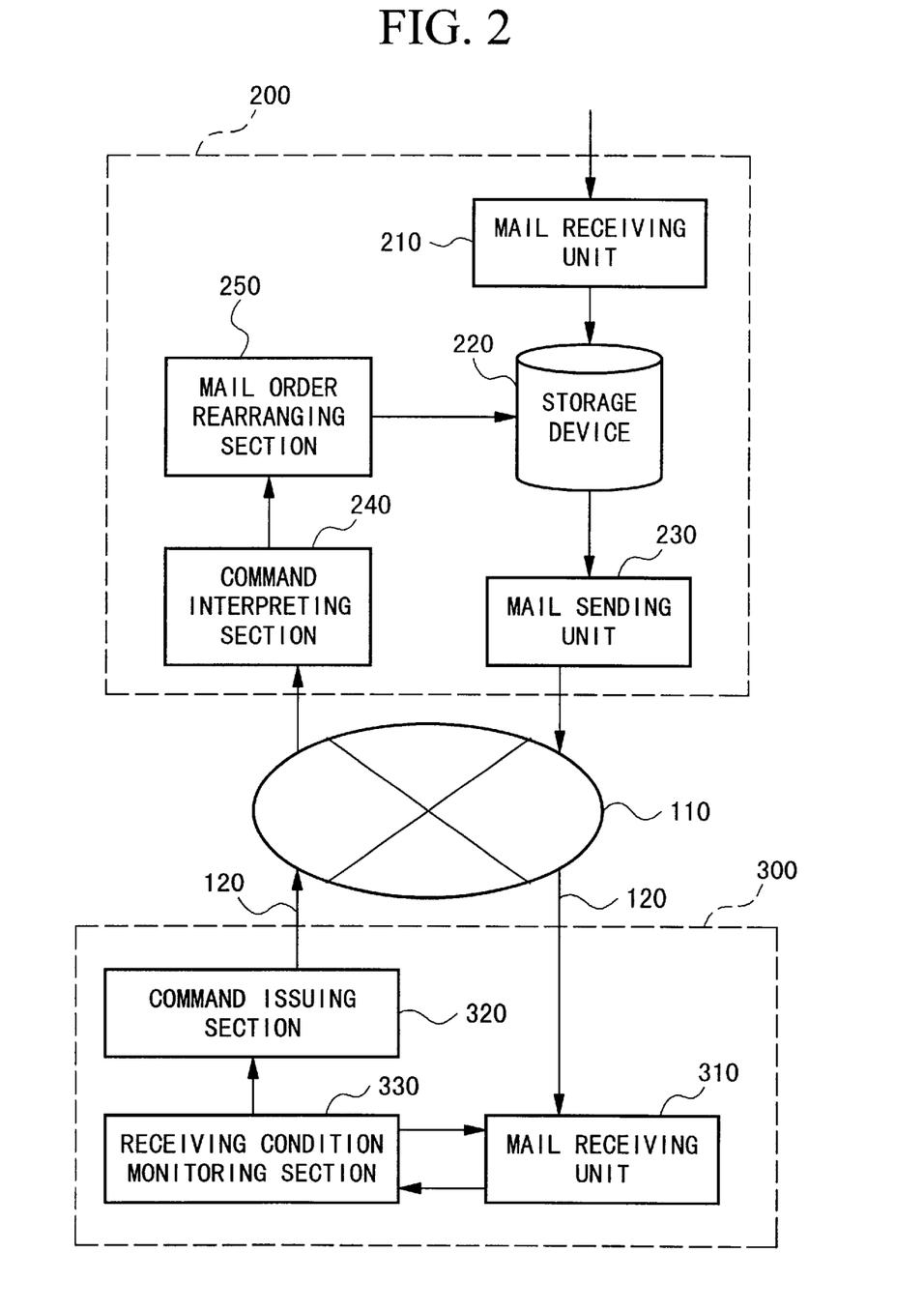
FIG. 2 is a block diagram showing the structures of the mail sender 200 and mail receiver 300 in FIG. 1.

FIG. 2 is a block diagram showing the structures of the mail sender 200 and mail receiver 300. In this figure, reference numeral 210 indicates a mail receiving unit for receiving mail data via communication network 100, and reference numeral 220 indicates a storage device for storing the mail data received by the mail receiving unit 210 in turn. Reference numeral 230 indicates a mail sending unit for receiving a mail sending request sent from mail receiver 300 via an established communication line including the communication network 110 and the transmission path 120, and reading out relevant mail data from the storage device 220 and sending the readout data to the communication line. The mail data which has been sent (that is, the sending operation is completed) is deleted from the storage device 220.

Reference numeral 240 indicates a command interpreting section for receiving a command sent from the mail receiver 300 and interpreting the command and generating a signal for indicating a suitable operation. Reference numeral 250 indicates a mail order rearranging section for receiving the signal generated by the command interpreting section 240 and rearranging the mail data stored in the storage device 220 in order of the data amount, from the smallest data to the largest data. Here, the method of rearranging mail data is not limited to the above method based on the data size, but the order of the mail data can be determined according to the degree of importance or urgency of each mail, for example, based on information about the addresser or addressee, or on each title.

Reference numeral 310 indicates a mail receiving unit for receiving and storing mail data sent via the wireless transmission path 120. This unit 310 monitors the data receiving condition at predetermined intervals, and generates and outputs a detection signal when the receiving condition changes.

Reference numeral 330 indicates a receiving condition monitoring section for outputting a signal for ordering the issue of a command in accordance with the detection signal generated by the mail receiving unit 310.

Reference numeral 320 indicates a command issuing section for generating a command and sending the command to the wireless transmission path 120 according to the output from the receiving condition monitoring section 330.

Figure 3:
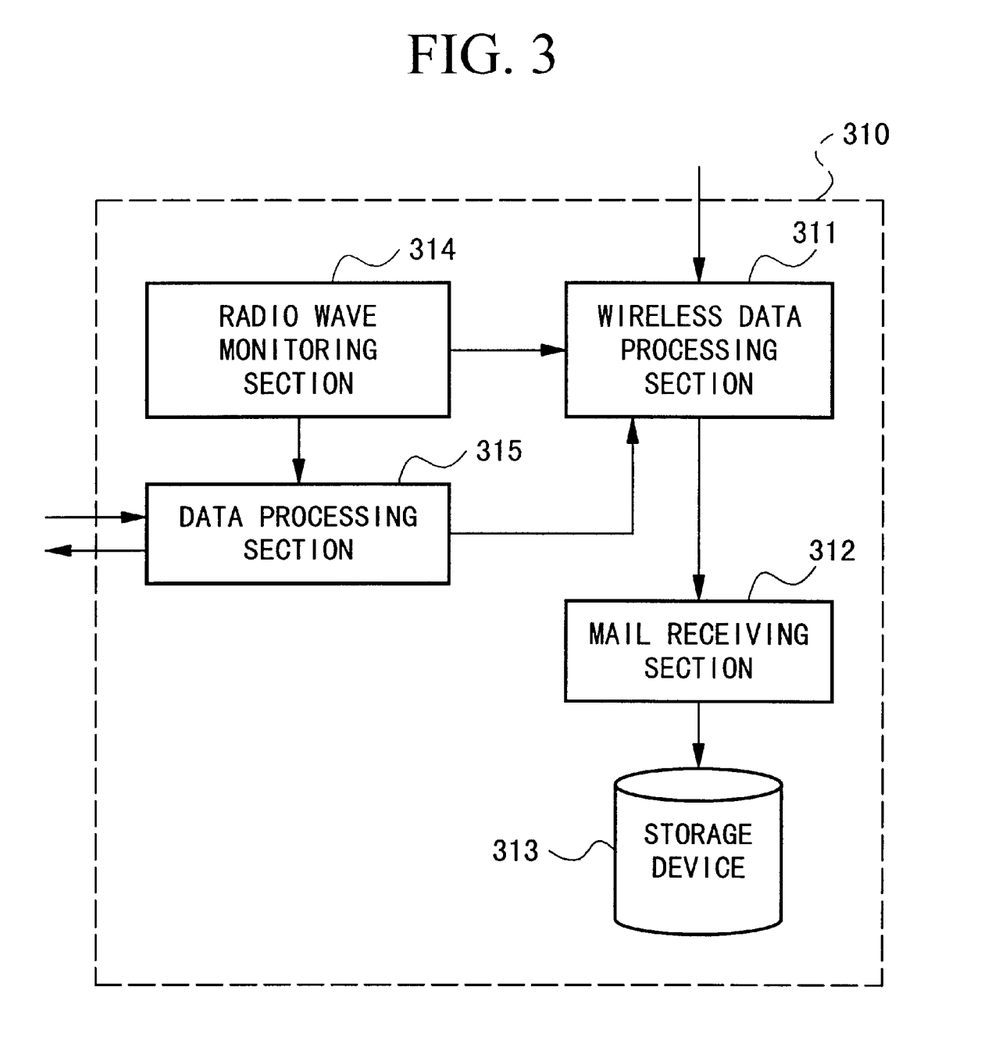
FIG. 3 is a block diagram showing the detailed structure of the mail receiving unit 310 in FIG. 2.

FIG. 3 is a block diagram showing the detailed structure of the mail receiving unit 310. The mail receiving unit 310 comprises wireless data processing section 311 for receiving a wireless signal via the wireless transmission path 120 and demodulating and outputting the received data sent as divided data units; mail receiving section 312 for receiving the data units (of the mail data) in turn and reconstructing the mail data of an e-mail; storage device 313 for storing the mail data sent from the mail receiving section 312; radio wave monitoring section 314 for always monitoring the intensity of the radio wave received by the wireless data processing section 311; and data processing section 315 for taking statistics of the intensity of the radio waves in a time sequence according to the output of the radio wave monitoring section 314, and generating a detection signal indicating a change of the receiving condition if the intensity (in the statistics) decreases below a predetermined threshold value.

Figure 4:
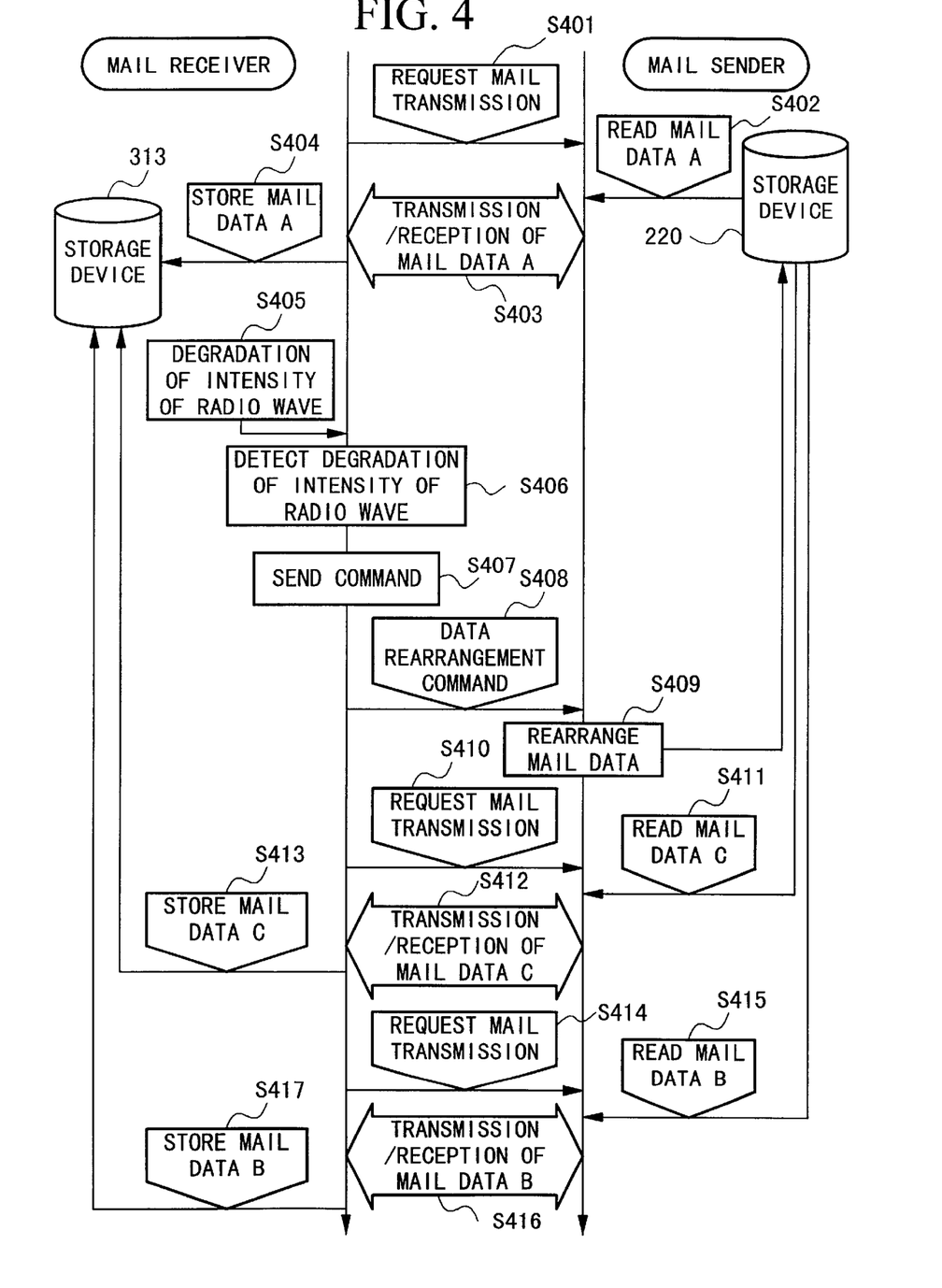
FIG. 4 is a chart showing an example operation flow of the mail sender 200 and mail receiver 300.
Figure 5:
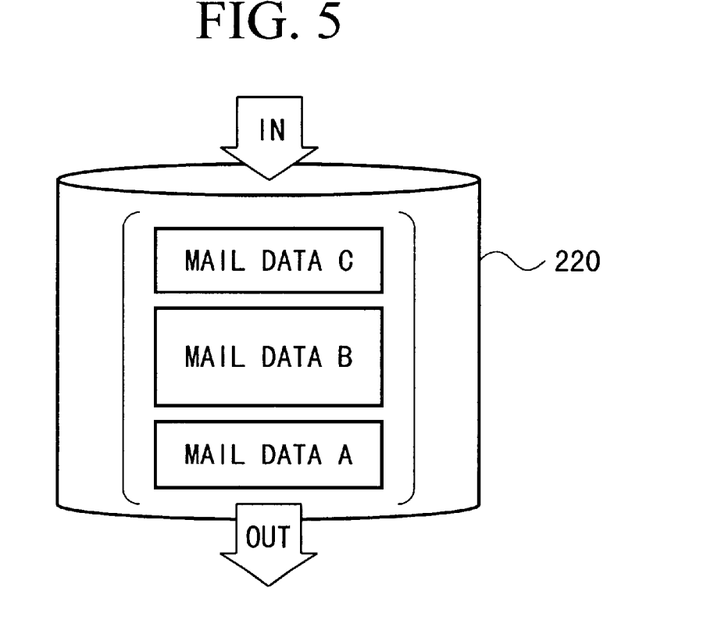
FIG. 5 is a diagram conceptually showing the storage condition of the mail data in the storage device provided in the mail sender.

FIG. 4 is a chart showing the operation flow of the mail sender 200 and mail receiver 300, and FIG. 5 is a diagram conceptually showing the storage condition of the mail data in storage device 220. As shown in FIG. 5, in storage device 220, three mail data A, B, and C are stored in this order which corresponds to the order of receiving data sent from a mail sending device connected to the Internet 100.

Figure 8:
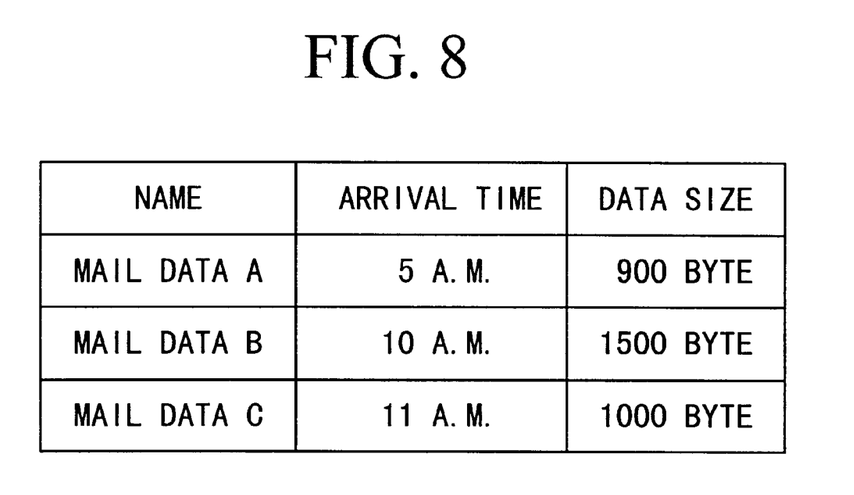
FIG. 8 is a diagram showing an example of the mail data storage information.

FIG. 8 is a diagram showing information such as the arrival time and data size of each mail data stored in the storage device 220. The above information in FIG. 8 is also stored as mail data storage information in the storage device 220. If the storage device stores each mail data as a file, the mail data storage information consists of the record time corresponding to the file name and an index indicating the data size.

Below, the operation of the e-mail system will be explained with reference to FIG. 4.

First, the communication path for connecting mail sender 200 and mail receiver 300 is established via communication network 110 and wireless transmission path 120, and a signal for requesting mail transmission is sent from the mail receiver 300 to the mail sender 200 (see step S401). The mail sender 200 receives the request of mail transmission, and supplies a control signal to the mail sending unit 230. The mail sending unit 230 reads out mail data A from the storage device 220 (i.e., data A is the first data in the storage order) based on the control signal (see step S402), and sends the readout data to the communication network 110 and wireless transmission path 120.

The mail receiver 300 receives mail data A via the communication network 110 and wireless transmission path 120 (see step S403). The wireless data processing section 311 receives a wireless signal, and demodulates the mail data sent in a divided form. The mail receiving section 312 reconstructs the mail data demodulated by the wireless data processing section 311 so as to generate mail data A of an e-mail. The mail data A is supplied to storage device 313 and stored in the storage device (see step S404).

Below, an example case will be explained, in which the intensity of the received radio wave decreases before mail receiver 300 issues a mail transmission request. When the intensity of the received radio wave decreases and the transmission quality of the wireless transmission path is degraded, it is difficult to continuously send data, and retransmission for each small data unit has to be performed. In this condition, the speed of transmitting and receiving the mail data decreases (see step S405).

The radio wave monitoring section 314 measures the receiving sensitivity (corresponding to the intensity of the received radio wave) of the wireless data processing section 311 at predetermined intervals, and supplies each measured value to the data processing section 315. The data processing section 315 records the measured values at predetermined intervals, and detects the decrease of the intensity of the radio wave according to a specific amount of change of the receiving sensitivity. Here, if it is assumed that the receiving sensitivity is 100% from the start to the end of receiving mail data A, and if the receiving sensitivity lowers to 60% after the completion of receiving mail data A, then data processing section 315 detects this decrease of the receiving sensitivity as a change of the receiving condition, and supplies a detection signal to the receiving condition monitoring section 330 (see step S406).

Here, a variation of the intensity of the received radio wave per unit time may be calculated based on the output from the radio wave monitoring section 314, and the detection signal may be generated when the variation becomes larger than a predetermined threshold value.

The receiving condition monitoring section 330 monitors the output of the detection signal (indicating a change of the receiving condition) from the mail receiving unit 310 at predetermined intervals. When the receiving condition monitoring section 330 receives the detection signal indicating the change of the receiving condition, the monitoring section 330 outputs a signal instructing the command issuing section 320 to issue a command. Here, the command includes a short message having a small size, for example, approximately 10 bytes, such as "send mail data in order of data size from the smallest one". The command issuing section 320 sends a command ordering the rearrangement of (the order of) mail data to the wireless transmission path 120, based on the signal supplied from the receiving condition monitoring section 330 (see step S407).

The command interpreting section 240 receives the command sent from the command issuing section 320 via the communication network 110 (see step S408), and interprets the received command with reference to the specific (i.e., predetermined) kind and description manner of the command. In the above case, the command interpreting section 240 recognizes the contents of the received command as "send mail data in order of data size from the smallest one". The command interpreting section 240 then supplies the command ordering the rearrangement of mail data to the mail order rearranging section 250.

Figure 6:
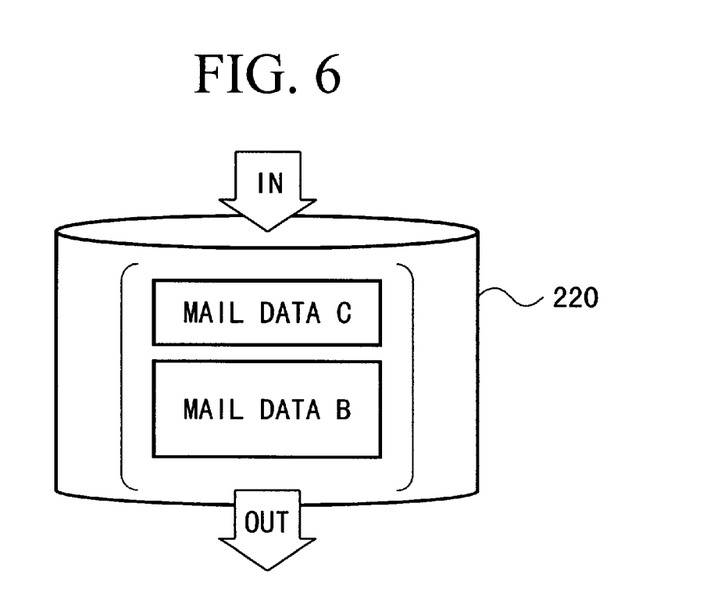
FIG. 6 is a diagram conceptually showing the storage condition of the mail data in the storage device provided in the mail sender.

In the storage device 220, mail data A has been sent and thus deleted, and mail data B and C are stored in this receiving order. FIG. 6 is a diagram conceptually showing the storage condition of the mail data B and C in storage device 220. Under this condition, the mail order rearranging section 250 refers to the mail data storage information stored in the storage device 220, and compares the sizes of the stored mail data. Here, according to the comparison result, it is determined that the size of mail data B is larger than the size of mail data C. Simultaneously, the mail order rearranging section 250 compares the arrival times of mail data B and C, and determines that mail data B is stored to be sent earlier than mail data C in the current order.

Figure 7:
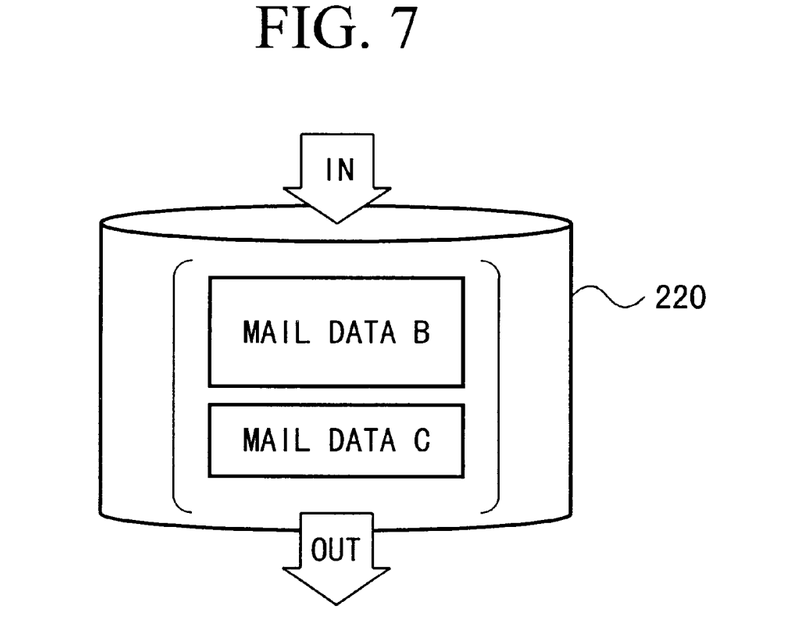
FIG. 7 is a diagram conceptually showing the storage condition of the mail data in the storage device provided in the mail sender.

The mail order rearranging section 250 rearranges (the order of) mail data B and C stored in storage device 220, according to the signal ordering the rearrangement supplied from the command interpreting section 240 (see step S409). In order to exchange the sending order of mail data B and C, the arrival times of each mail data in the mail data storage information may be exchanged. FIG. 7 is a diagram conceptually showing the storage condition of the mail data B and C in storage device 220 after the sending order of mail data is rearranged.

Next, a mail data sending request is transmitted from the mail receiver 300 to the mail sender 200 (see step S410), and mail data C is sent from the mail sender 200 according to operations similar to those explained above (see steps S411 and S412). When the operation of receiving mail data C, performed by the mail receiver 300, is completed (see step S413), a request for sending the next mail data is transmitted (see step S414). The mail sender 200 receives the mail data sending request, and sends mail data B (see steps S415 and S416). The mail receiver 300 receives and stores mail data B (see step S417), and the operation of receiving mail data B is completed.

Figure 9:
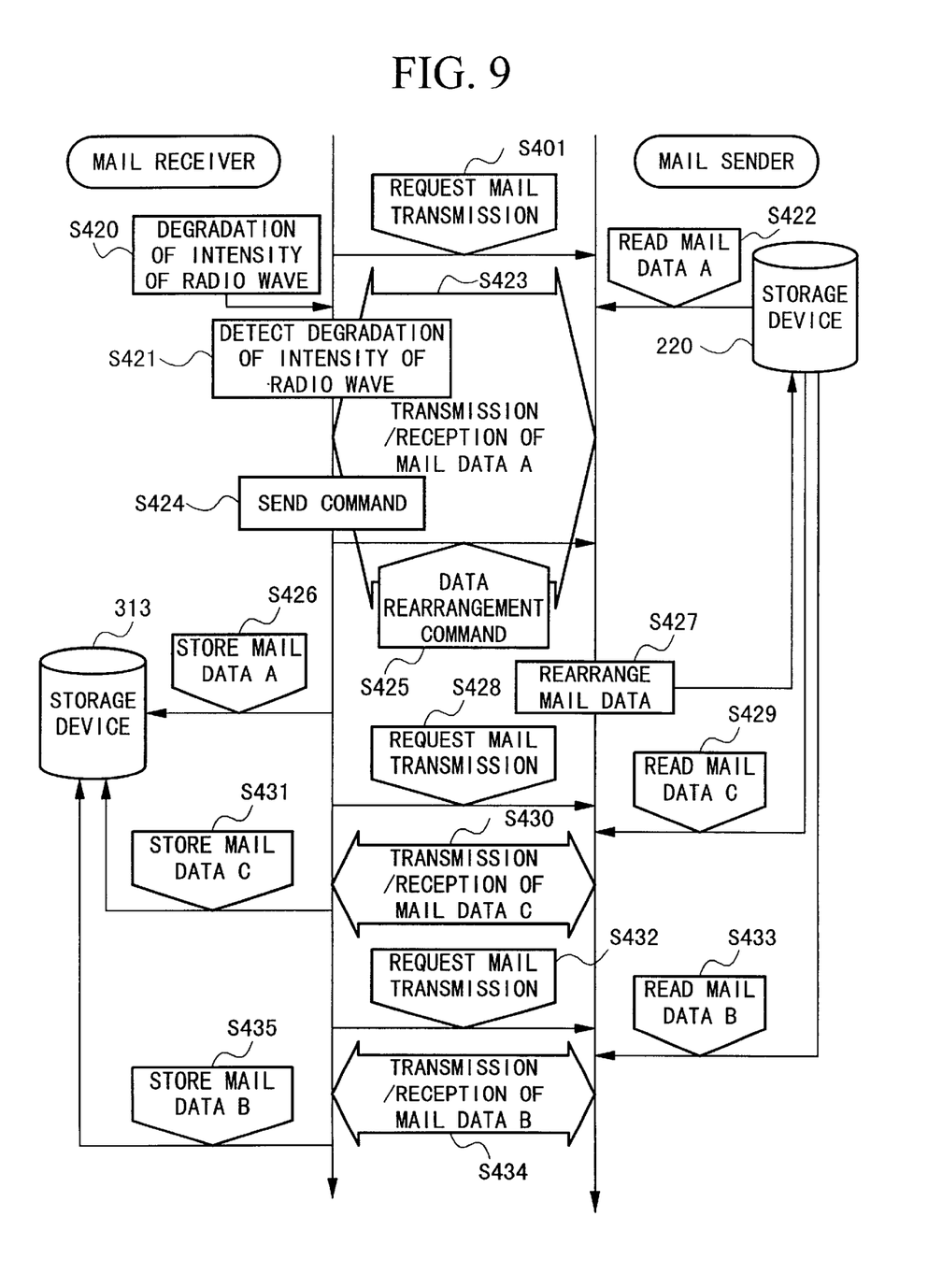
FIG. 9 is a chart showing an example operation flow of the mail sender 200 and mail receiver 300.

Below, another example case will be explained, in which the intensity of the radio waves received through the wireless transmission path 120 decreases during the operation of receiving mail data, for example, mail data A. FIG. 9 is a chart showing the operation flow of the e-mail system in this case. Referring to this figure, it is assumed that after a mail data sending request is sent from the mail receiver 300 (see step S401), the intensity of received radio wave decreases during the operation of sending and receiving mail data A (see steps S420, S422, and S423). The mail receiver 200 detects the decrease of intensity (see step S421), and sends a command (see steps S424 and S425).

During the operation of sending and receiving mail data A, a signal for confirming the normal reception of each divided data unit is exchanged between the mail sender 200 and mail receiver 300 according to a rule defined for correctly transmitting the data. The above command is sent while the above confirmation signal is exchanged. The mail sender 200 receives this command and rearranges (i.e., exchanges) the order of mail data B and C stored in the storage device 220 (see step S427). After that, mail data C and B are sent in this order according to the operations similar to those explained above (see steps S428 to S435).

Second Embodiment

The second embodiment according to the present invention will be explained with reference to the drawings.

Figure 10:
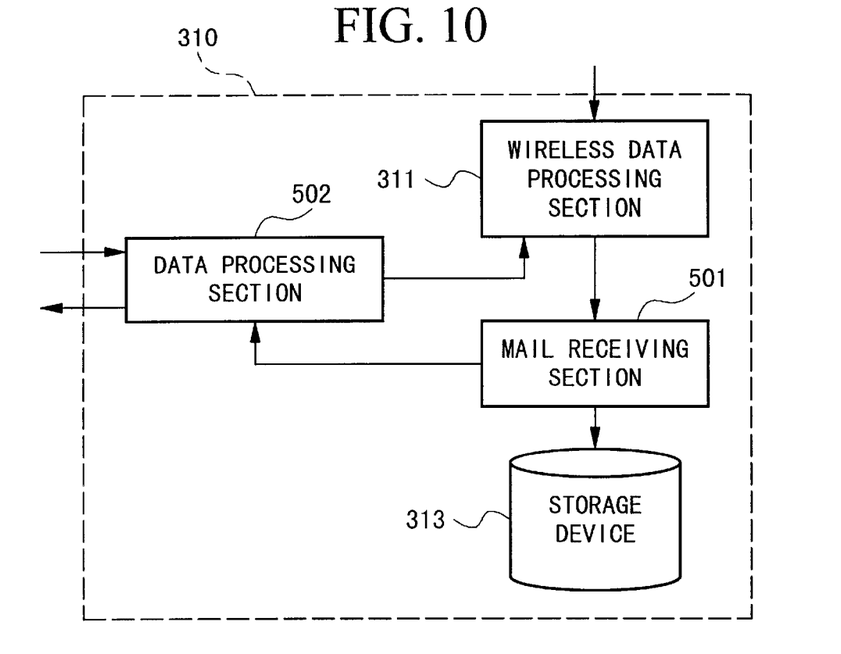
FIG. 10 is a block diagram showing the detailed structure of the mail receiving unit in the second embodiment.

FIG. 10 is a block diagram showing the structure of the mail receiving unit 310 of the e-mail system in the second embodiment. In FIG. 10, parts identical to those in FIG. 3 (of the first embodiment) are given identical reference numerals, and detailed explanations thereof are omitted. In FIG. 10, the mail receiving unit 310 comprises wireless data processing section 311, mail receiving section 501, storage device 313, and data processing section 502.

The operation of the above structure will be explained below. The wireless data processing section 311 receives a wireless signal from the wireless transmission path 120, and demodulates the mail data (sent in a divided form) in turn. The mail receiving section 501 reconstructs the demodulated mail data so as to generate mail data corresponding to an e-mail, and the reconstructed data is stored in storage device 313. Simultaneously, the size of the reconstructed data is communicated to the data processing section 502 at predetermined intervals. The data processing section 502 calculates the speed of reconstruction of mail data at predetermined intervals based on the size of mail data received from the mail receiving section 501, and if the calculated speed decreases below a predetermined threshold value, the data processing section 502 sends a signal indicating a change of the receiving condition to the receiving condition monitoring section 330.

For example, it is assumed that the predetermined threshold value is 12 Kbyte/sec and mail data A is currently received. If the speed of reconstructing mail data changes from 20 Kbyte/sec to 10 Kbyte/sec, the data processing section 502 outputs a detection signal just when the speed of reconstructing mail data becomes lower than the threshold value.

Here, a variation of the speed of mail data reconstruction per unit time may be calculated, and the detection signal may be generated when the variation becomes larger than a predetermined threshold value.

After that, according to an operation similar to that of the first embodiment, a command is issued from the command issuing section, and in the mail sender 200, the mail data stored in the storage device 220 are rearranged.

Third Embodiment

Below, the third embodiment according to the present invention will be explained with reference to the drawings.

Figure 11:
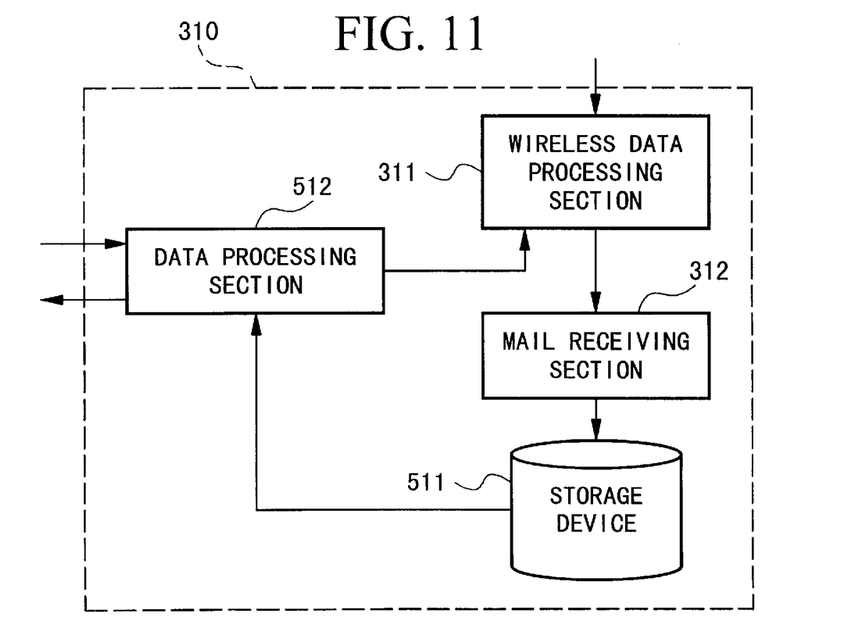
FIG. 11 is a block diagram showing the detailed structure of the mail receiving unit in the third embodiment.

FIG. 11 is a block diagram showing the structure of the mail receiving unit 310 of the e-mail system in the third embodiment. In FIG. 11, parts identical to those in FIG. 3 (of the first embodiment) are given identical reference numerals, and detailed explanations thereof are omitted. In FIG. 11, the mail receiving unit 310 comprises wireless data processing section 311, mail receiving section 312, storage device 511, and data processing section 512.

The operation of the above structure will be explained below. The wireless data processing section 311 receives a wireless signal and demodulates the signal. The mail receiving section 312 reconstructs the demodulated mail data so as to generate mail data corresponding to an e-mail, and stores the reconstructed data in storage device 511. The storage device 511 informs the data processing section 512 of the vacant capacity at predetermined intervals. Based on this information, the data processing section 512 outputs a detection signal indicating a change of the receiving condition to the receiving condition monitoring section 330 when the vacant capacity of the storage device 511 decreases below a predetermined threshold value.

For example, it is assumed that the predetermined threshold value is 1 Kbyte, and the vacant capacity is 1.8 Kbyte when the first half of mail data A has been received. It is also assumed that the vacant capacity is 0.9 Kbyte when all of the mail data A has been received. In this case, the data processing section 512 outputs a detection signal just when the vacant capacity becomes lower than the threshold value.

After that, according to an operation similar to that of the first embodiment, a command is issued from the command issuing section, and in the mail sender 200, the mail data stored in the storage device 220 are rearranged.

Fourth Embodiment

Below, the fourth embodiment according to the present invention will be explained with reference to the drawings.

Figure 12:
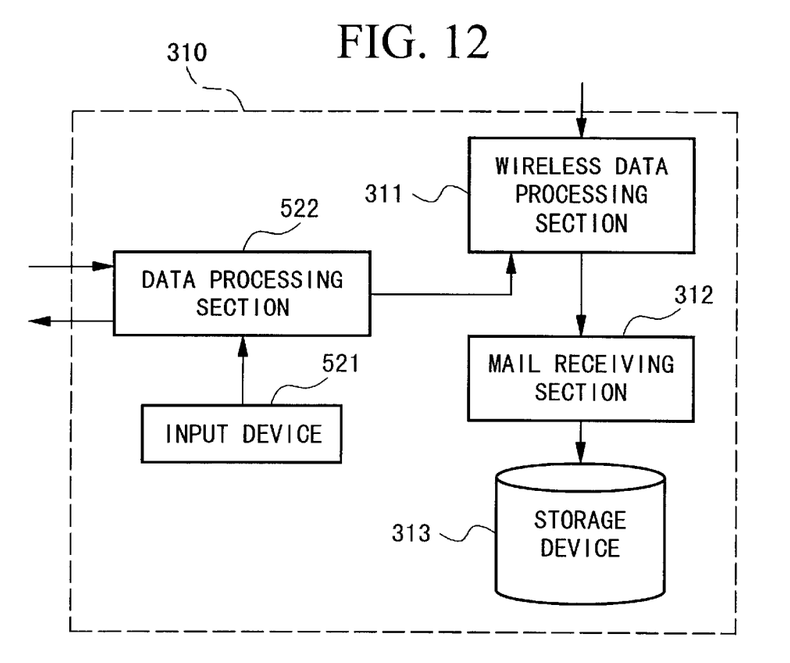
FIG. 12 is a block diagram showing the detailed structure of the mail receiving unit in the fourth embodiment.

FIG. 12 is a block diagram showing the structure of the mail receiving unit 310 of the e-mail system in the fourth embodiment. In FIG. 12, parts identical to those in FIG. 3 (of the first embodiment) are given identical reference numerals, and detailed explanations thereof are omitted. In FIG. 12, the mail receiving unit 310 comprises wireless data processing section 311, mail receiving section 312, storage device 313, input device 521, and data processing section 522. The input device 521 is provided for the user of the mail receiver 300 to input (i) a signal for communicating a change of the receiving condition, or (ii) a signal for ordering the rearrangement of the sending order of mail data stored in the mail sender 200.

The operation of the above structure will be explained below. While mail data is received by mail receiver 300, the user inputs a signal for communicating a change of the receiving condition, or a signal for ordering the rearrangement of the sending order of mail data, by using the input device 521. The signal input via the input device 521 is supplied to the data processing section 522. Based on the input information, the data processing section 522 outputs a signal communicating a change of the receiving condition.

After that, according to an operation similar to that of the first embodiment, a command is issued from the command issuing section, and in the mail sender 200, the mail data stored in the storage device 220 are rearranged.

Figure 13:
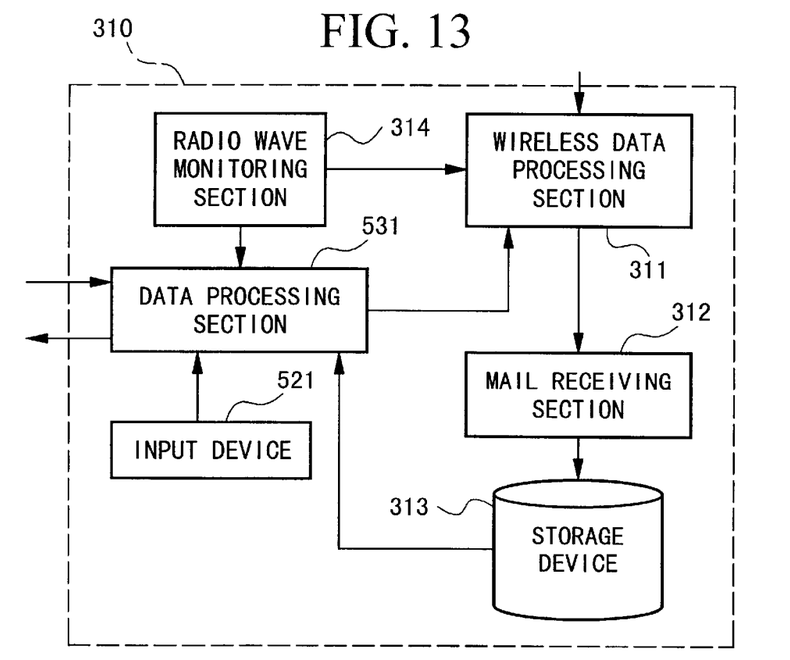
FIG. 13 is a block diagram showing the detailed structure of the mail receiving unit in case of combining the first and fourth embodiments.

As for the above embodiments, priority levels may be assigned to (the structures and operations) of each embodiment and some of the embodiments may be combined. FIG. 13 is a block diagram showing the structure of mail receiving unit 310 of the e-mail system for performing a combined method of (i) the method of detecting the change of the receiving condition of the first embodiment, and (ii) the signal input method of the fourth embodiment. In the structure, the data processing section 531 generates a detection signal supplied to the receiving condition monitoring section 330, based on the signal input via the input device 521 and the measured value sent from the radio wave monitoring section 314.

In addition, the mail receiving unit 310 may comprise a wireless data processing section for receiving and demodulating the wireless signal from the second communication network, and measuring an error rate of the demodulated digital signal of the mail data according to specific codes included in the digital signal. In this case, the detection signal indicating a change of the receiving condition is generated when the measured error rate of the digital signal becomes larger than a predetermined threshold value.

Furthermore, the mail receiving unit 310 may comprise a radio wave monitoring section for measuring the power supply voltage of the mail receiver 300 at predetermined intervals. In this case, the detection signal indicating a change of the receiving condition is generated when the measured power supply voltage becomes lower than a predetermined threshold value.

What is claimed is:

1. An electronic mail system comprising:
    a mail server having a mail sender which is connected to a first communication network including a data communication network and which receives an electronic mail and sends the received electronic mail to a relevant client;
    a client having a mail receiver for receiving the electronic mail sent from the mail sender; and
    a second communication network including a wireless transmission path, for connecting the mail server and the client, wherein:
    the mail sender comprises:
        a first mail receiving unit for receiving mail data of each electronic mail sent via the first communication network,
        a storage device for storing the mail data received by the first mail receiving unit in turn;
        a mail sending unit for reading out the mail data stored in the storage device, and sending the readout mail data to the second communication network;

a command interpreting section for receiving and interpreting a command, generated by the client, sent via the second communication network, and outputting a signal ordering rearranging the mail data stored in the storage device in response to receipt of said command; and a mail order rearranging section for rearranging the order of the mail data stored in the storage device, based on the signal sent from the command interpreting section, and the mail receiver comprises:

a second mail receiving unit for receiving a wireless signal corresponding to the readout mail data from the second communication network, and demodulating and storing the mail data from the received wireless signal, and monitoring the received wireless signal of the mail data so as to detect a change of a receiving condition of the received wireless signal and output a detection signal, said receiving condition corresponding to an intensity of the received wireless signal;

a receiving condition monitoring section for receiving the detection signal indicating a change of the receiving condition from the second mail receiving unit, and, in response thereto, outputting a signal ordering the issue of said command; and a command issuing section for sending said command according to the output from the receiving condition monitoring section to the second communication network.

2. An electronic mail system as claimed in claim 1, wherein the second mail receiving unit comprises a radio wave monitoring section for detecting and outputting the intensity of the received radio wave of the wireless signal at predetermined intervals, and generates the detection signal indicating a change of the receiving condition based on the output from the radio wave monitoring section.

3. An electronic mail system as claimed in claim 2, wherein the output from the radio wave monitoring section is compared with a predetermined threshold value, and the detection signal is generated when the intensity of the received radio wave becomes lower than the threshold value.

4. An electronic mail system as claimed in claim 2, wherein a variation of the intensity of the received radio wave per unit time is calculated based on the output from the radio wave monitoring section, and the detection signal is generated when the variation becomes larger than a predetermined threshold value.

5. An electronic mail system as claimed in claim 1, wherein:

the mail data are sent to the mail receiving unit in a divided form; and the second mail receiving unit comprises a mail receiving section for reconstructing and outputting the mail data corresponding to an electronic mail, and also outputting information on the size of the reconstructed mail data at predetermined intervals; and the second mail receiving unit calculates the speed of reconstruction of the mail data at predetermined intervals based on the data size information output from the mail receiving section, and generates the detection signal indicating a change of the receiving condition based on the calculated speed of reconstruction.

6. An electronic mail system as claimed in claim 5, wherein the second mail receiving unit compares the speed of mail data reconstruction with a predetermined threshold value, and generates the detection signal when the speed becomes lower than a predetermined threshold value.

7. An electronic mail system as claimed in claim 5, wherein the second mail receiving unit calculates a variation of the speed of mail data reconstruction per unit time, and generates the detection signal when the variation becomes larger than a predetermined threshold value.

8. An electronic mail system as claimed in claim 1, wherein the second mail receiving unit comprises a storage device for storing the received mail data and outputting information on the vacant capacity at predetermined intervals, and generates the detection signal indicating a change of the receiving condition when the vacant capacity of the storage device, detected according to the information on the vacant capacity, becomes lower than a predetermined capacity.

9. An electronic mail system as claimed in claim 1, wherein:

the second mail receiving unit comprises an input device for a user of the mail receiver to input a signal for communicating a change of the receiving condition, or a signal for ordering the rearrangement of the sending order of mail data stored in the mail sender; and the second mail receiving unit generates the detecting signal supplied to the receiving condition monitoring section, based on a signal input via the input device.

10. An electronic mail system as claimed in claim 1, wherein:

the second mail receiving unit comprises a wireless data processing section for receiving and demodulating the wireless signal from the second communication network, and measuring an error rate of the demodulated digital signal of the mail data according to specific codes included in the digital signal; and the second mail receiving unit generates the detection signal when the measured error rate of the digital signal becomes larger than a predetermined threshold value.

11. An electronic mail system as claimed in claim 1, wherein the second mail receiving unit comprises a radio wave monitoring section for measuring the power supply voltage of the mail receiver at predetermined intervals, and generates the detection signal when the measured power supply voltage becomes lower than a predetermined threshold value.

12. An electronic mail system as claimed in claim 1, wherein in the rearrangement of the mail data performed by the mail order rearranging section, the order of the mail data is determined according to the degree of importance or urgency of each mail.

13. An electronic mail system as claimed in claim 1, wherein the storage device in the mail sender also stores mail data storage information which indicates a property of each electronic mail.

* * * * *